Figure 4:
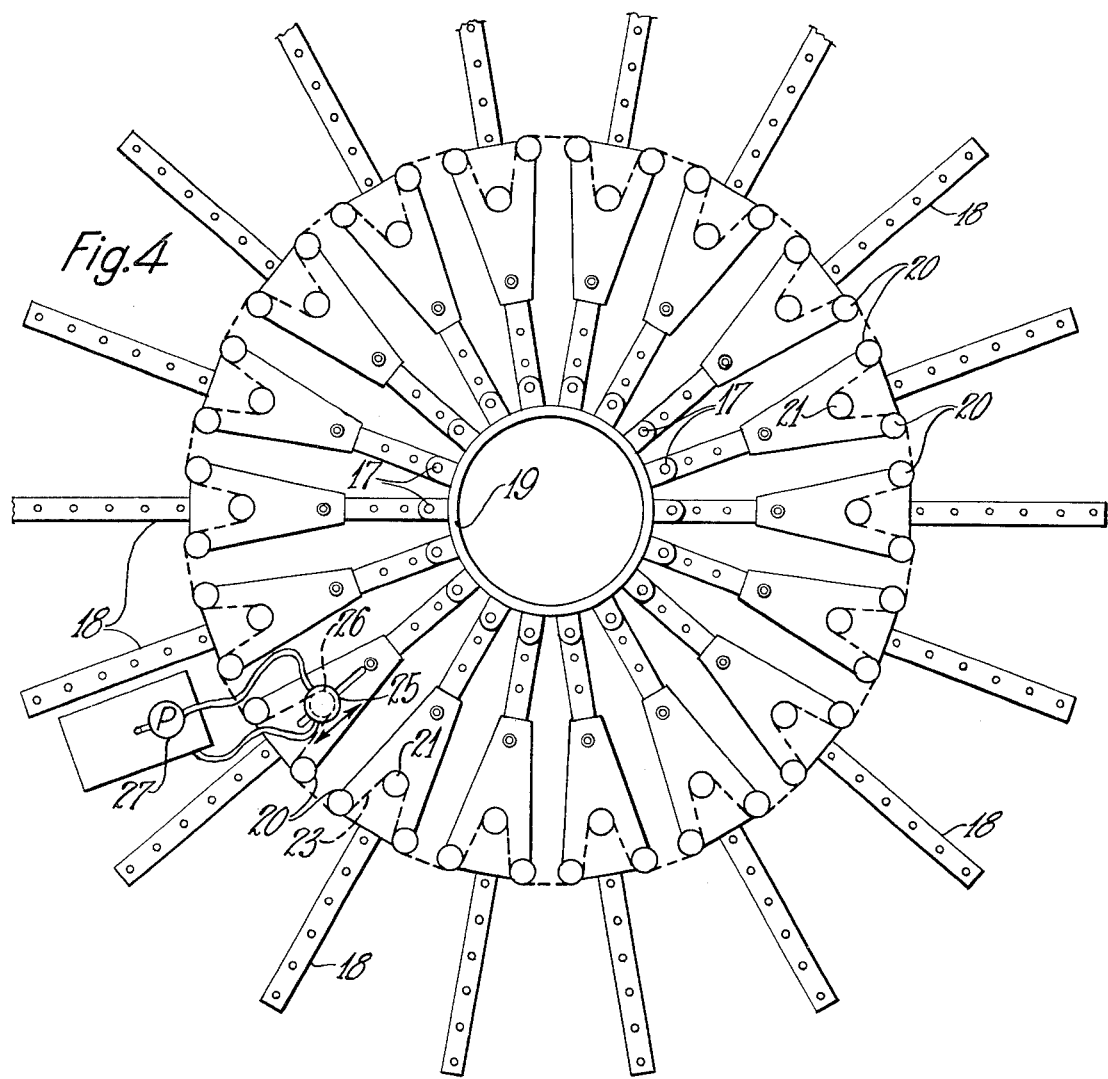

United States Patent [19]
Poulsen

[11] 3,914,151
[45] Oct. 21, 1975

[54] MANDREL FOR THE PRODUCTION OF REINFORCED PLASTIC TUBING

[75] Inventor: Peder Ulrik Poulsen, Fredensborg, Denmark

[73] Assignee: Owens-Corning Fiberglas Corporation, Toledo, Ohio

[22] Filed: May 28, 1974

[21] Appl. No.: 473,607

Related U.S. Application Data

[63] Continuation-in-part of Ser. No. 271,309, July 13, 1972, Pat. No. 3,861,984.

[30] Foreign Application Priority Data
Nov. 2, 1971  Denmark ............................ 5344/71

[52] U.S. Cl. .............................. 156/425; 156/429
[51] Int. Cl.² ........................................ B65H 81/00
[58] Field of Search ........................... 156/173–175, 156/189, 195, 425–432, 446, 143; 242/47.08–47.11; 93/80

[56] References Cited
UNITED STATES PATENTS

| | | | |
|---|---|---|---|
| 2,539,853 | 1/1951 | Meyers et al. .................. | 156/428 X |
| 2,922,296 | 1/1960 | Kuljian ......................... | 242/47.09 X |
| 3,558,411 | 1/1971 | Beelien .......................... | 156/174 X |

FOREIGN PATENTS OR APPLICATIONS
43-23359  10/1968  Japan

*Primary Examiner*—William A. Powell
*Assistant Examiner*—David A. Simmons
*Attorney, Agent, or Firm*—Carl G. Staelin; John W. Overman

[57] ABSTRACT

The invention is a continuous working mandrel for the production of tubing, especially fiber reinforced plastic tubing. An endless metal strip is helically wound around a hollow core and extends back through the center of the core to provide a continuously advancing and recirculating mandrel surface on which the tubing is formed. The core comprises a plurality of parallel rollers spaced about the periphery of an imaginary cylinder. The rollers are driven to circulate the endless strip about the core. In one embodiment the rollers are provided with means, such as a series of grooves, which engage means on the endless strip to guide and support the strip along its helical path. Means for synchronously driving the plurality of rollers and which is adaptable for providing simultaneous radial adjustment of the rollers to change the diameter of the mandrel, is also disclosed.

7 Claims, 13 Drawing Figures

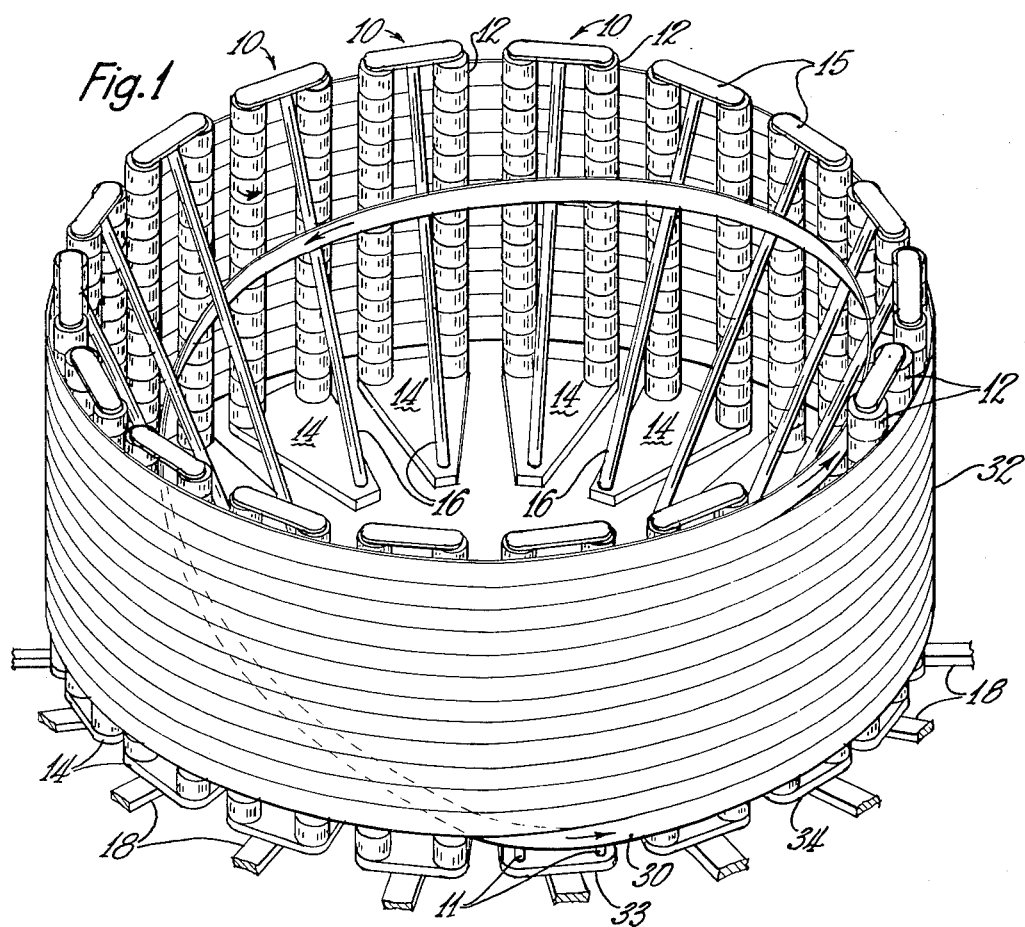
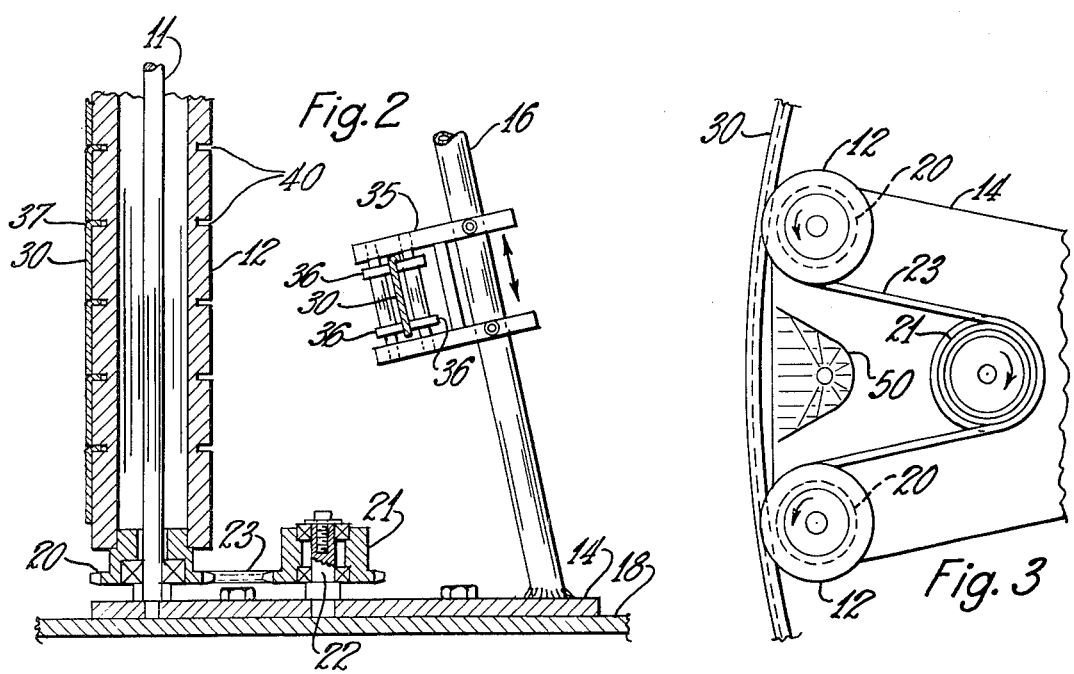

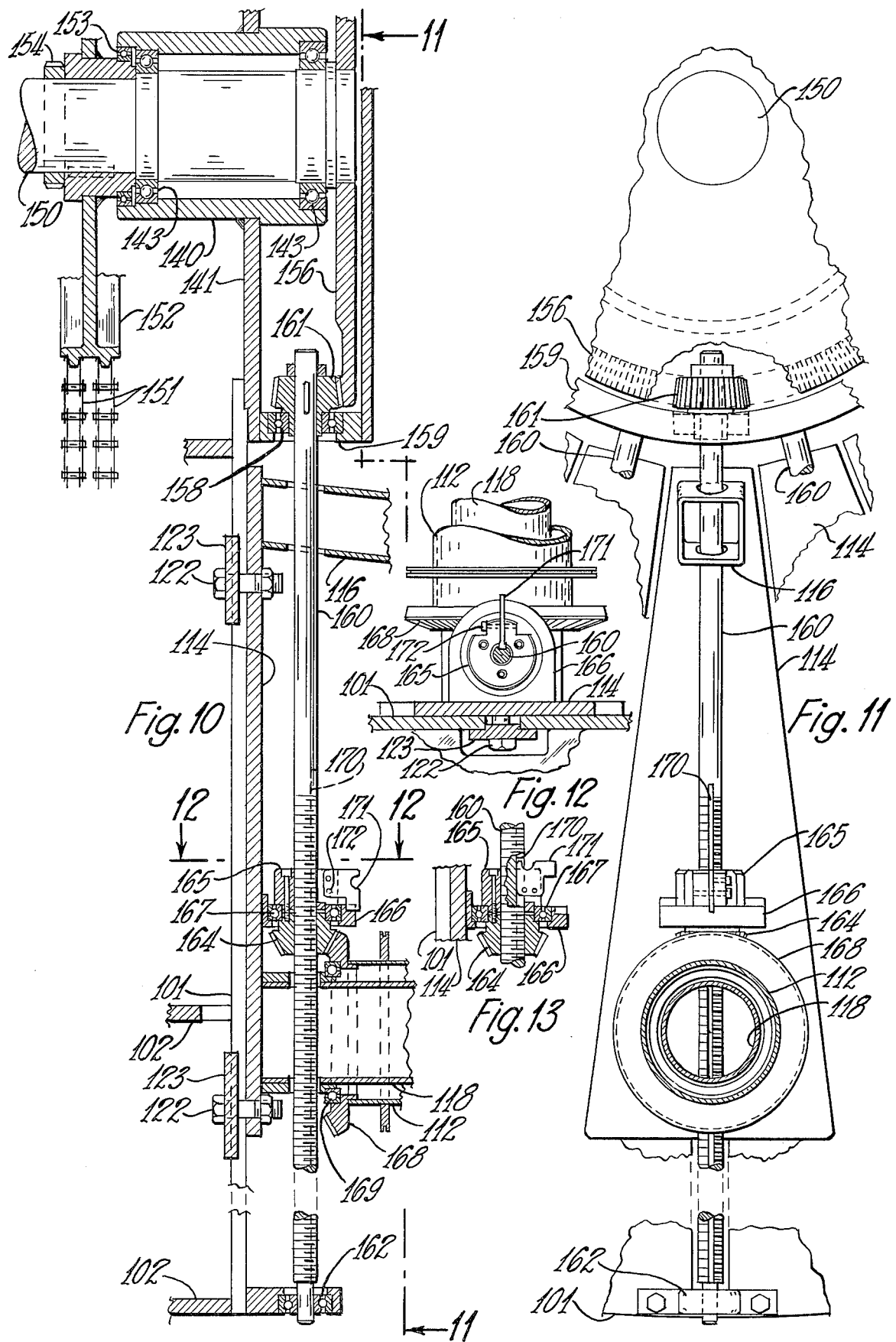

MANDREL FOR THE PRODUCTION OF REINFORCED PLASTIC TUBING

This is a continuation-in-part of application Ser. No. 271,309, filed July 13, 1972 now U.S. Pat. No. 3,861,984.

INTRODUCTION

This invention relates generally to driven mandrels suitable for the continuous production of tubing of indefinite length. The mandrel of this invention is particularly well suited for the production of fiber reinforced plastic tubing, and still more particularly, for the on-site production of tubular plastic shells for large diameter vertical storage tanks.

Continuous working mandrels, i.e. mandrels supported from one end and having a surface continuously advancing toward the free end thereof, are well known in the art. Such mandrels have become increasingly popular for the production of continuous tubing from materials not particularly suited for extrusion, pultrusion, or other continuous processes.

Continuous working mandrels find increasing use in the manufacture of tubular shapes of fiber reinforced plastics used for pipe, tanks shells, etc. Such items are made by applying liquid resin and fibers to the working surface of the mandrels by any of several conventional techniques including spraying, hand lay-up, and filament winding. Since the mandrel surface continually advances toward the free end, the tubular form is continuously advanced until free of the mandrel. When the tubing is set to a handleable state it is cut to the desired length.

In one well known design of a continuous working mandrel, the working surface is formed by an endless flexible strip which is helically wound on and supported by a tubular core having a free end. The endless strip is continuously and helically wound in a plurality of close spaced convolutions advancing toward the free end of the core, and then carried back through the mandrel core to the point where the winding began.

The mandrel core may be either a unitary tubular body or a plurality of rails or longitudinal members extending from a common mount. The latter construction offers the advantage of being adjustable in diameter. In this latter construction the longitudinal supports are spaced around the periphery of the tubular core and aligned parallel to the mandrel axis.

In the prior art mandrels of the type described, the core rotates and the strip is wound and advanced by the frictional pull of the rotating core. Thus whether the core is a unitary body, or a structure of rails, it must support the endless strip by means which provide a sufficient frictional pulling force in the tangential direction while allowing free longitudinal movement of the strip.

In one version of the prior art mandrels, the tubular core is provided with endless driven support belts or chains as the means for winding and advancing the endless strip. Such a mandrel is shown and more fully described in U.S. Pat. No. 3,004,585. It is a drawback of this version that the necessary large number of driven belts or chains requires a rather complicated and expensive drive mechanism. Furthermore, during the operation a considerable friction develops between the side edges of the support belt and the sidewalls of the groove guiding the belt, or between the groove bottom and the support belt, which friction impedes the free movement of the strip convolutions toward the free core end.

In another well known version of the above described mandrel, as described in U.S. Pat. No. 3,464,879, the rails of the mandrel core structure are provided with a large number of recirculating balls riding in grooves in the rails. In another version of the same mandrel, roller bearings are substituted for the recirculating balls. The endless strip is supported on these rollers or balls. The strip convolutions are advanced toward the free end of the mandrel by means of a cam mechanism acting against the edge of the starting convolution.

Because each convolution is urged forward by the pressure of the next following convolution, it is a characteristic of this mandrel version that all convolutions are in close edge to edge relationship forming a smooth mandrel surface on which to form the plastic tubing. However, in spite of the friction reducing effect of the rollers or balls, a considerable pressure often appears between two strip convolutions. This pressure frequently causes the edges of adjacent convolutions to slip against each other resulting in an overlapping. This condition requires immediate action and can only be remedied by stopping the entire process, and unwinding and rewinding the convolutions in question. The likelihood of this condition occurring is increased when the mandrel is disposed vertically and the weight of the tubular article adds to the pressure between adjacent convolutions.

Another problem encountered with the prior art endless mandrels, especially of the large sizes, is the difficulty in changing diameters. The disassembly and reassembly of numerous parts is usually required to effect the size change.

It is a principal object of the present invention to provide a continuous working mandrel for the production of reinforced plastic tubing which overcomes the drawbacks of the prior art mandrels as described above.

It is a further object of the invention to provide a continuous working mandrel having an endless strip helically wound to form a working surface, in which each convolution of the strip is supported in the direction of the mandrel axis, which mandrel is therefore better suited for making tubing on a vertical axis.

It is a still further object of this invention to provide a continuous working mandrel of a design that is sufficiently simple in construction to allow easy dismantling and reassembly for on-site production of vertically standing tanks and silos having diameters of 30–40 feet or more.

It is a further object of this invention to provide a continuous working mandrel which includes improved means for changing the diametrical size of the mandrel.

These and other objects are achieved by the mandrel of my invention which comprises a hollow core mounted at one end; an endless strip wound helically around the back through the core to form a working surface; means on the core for providing support in the direction of the axis of the helix for each convolution of the strip, and means for continuously advancing the strip relative to the core.

In one embodiment of my invention the core or frame is comprised of a plurality of rollers spaced peripherally around an imaginary cylinder and extending parallel to the axis of the mandrel. It is preferred that the mandrel be designed so the support rollers can be easily shifted radially, and the strip length adjusted ac- Referring to FIG. 4, the beams 18 are pivotably mounted on a common center ring 19, and extend therefrom like the spokes of a wheel. The beams may be swung together by turning them about the pivot points 17, or taken off if desired. Thereby the mandrel can be folded together into a narrow shape for road transportation after disassembly of the endless strip 30, the drive chain 23, and some of the support units.

Shown in FIGS. 2, 3, and 4 is a simple embodiment of a drive arrangement for the mandrel of FIG. 1. On each support roller 12 is mounted a sprocket wheel 20. In a fixed position on the base plate 14 of each support unit is mounted a third sprocket wheel 21 which is rotatable about a shaft 22. A roller chain 23 is guided around the sprockets as shown in FIGS. 3 and 4. The proper chain tension is maintained by means of one radially moveable tightening wheel 25 mounted on the shaft of a hydraulic motor 26. A variable output pump unit 27 feeds the motor 26 to cause the synchronous rotation of all support rollers with a speed that is variable between zero and maximum. Accordingly with this drive arrangement, when the mandrel diameter is changed it is only necessary to adjust the length of the roller chain 23.

Referring again to FIG. 1, the mandrel surface 32 is formed by a series of convolutions of a continuous strip. As used herein the terms strip, tape, or band are used interchangeably to mean a thin metal sheet which is relatively narrow in proportion to its length. The width and thickness of the strip 30, which is of a flexible but strong material, preferably steel, are determined by factors related to the particular application, including primarily the mandrel diameter.

The strip 30 is wound onto the mandrel core starting at the unit 33 and helically wrapped upward to form the mandrel surface. The strip is then taken off towards the center at the unit 34 and forms a reverse helix back through the center of the core. The strip continues out near the support unit 33 where it is welded to the first convolution to form an endless strip.

To facilitate the wrapping arrangement described the support unit 34 is lower than the others thereby allowing the strip 30 to be guided above unit 34 as it begins its return loop. Similarly, the support unit 33 is reduced in diameter in order to avoid excessive bending of the strip 30 at this point.

On its way back and down the return convolutions, the strip 30 passes closely by all truss members 16 and through individual guide units 35 provided with rollers 36. The guide units 35 are spaced along the respective truss members in accordance with the correct path of the strip. Proper tensioning of the endless strip is accomplished by shifting all or part of the guide units 35 upward along the sloping truss members whereby the return convolution is given a larger diameter.

In the operation of the mandrel described, the drive unit, as shown in FIG. 4, provides for the synchronous rotation of all the support rollers 12. The support rollers in turn cause the continuous circulation of the helically wound strip 30, thereby providing a continuous working surface 32 on which the product is formed by any well known technique.

Figure 5:
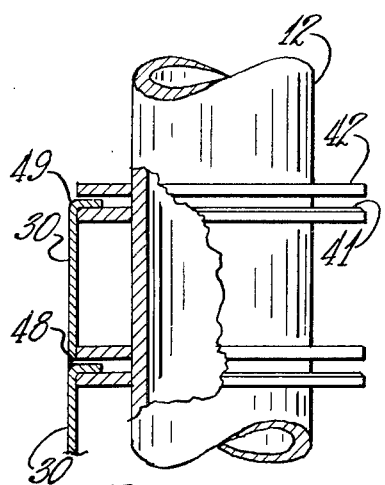

When the mandrel described here is operated at or near its maximum diameter, the distance between support rollers is necessarily at a maximum also. Therefore, in order to prevent flat spots in the mandrel surface between support rollers, provision must be made for the proper stiffness of the strip 30. To this end it has been found particularly suitable to provide a right angle bend along one entire edge of the band as shown in FIGS. 2 and 5. The depth of the bend, like the thickness of the band, is determined by the amount of bending which the strip must endure.

Figure 6:
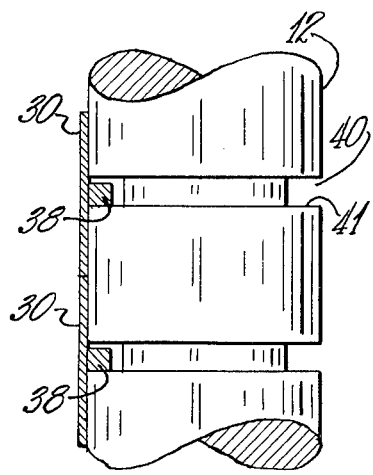

Although the right angle bend 37 is one suitable means for stiffening the strip 30, other means will occur to those skilled in the art and are included within the contemplation of the invention. One of these other stiffening means is shown in FIG. 6 wherein the strip is provided with a narrower strip 38 welded to the back of the strip along its centerline. A similar stiffening means could be provided by forming a lateral fold in the strip along its length.

As mentioned earlier, one particular feature of the present invention making it preferable over the prior art mandrels resides in the provision of support in the axial direction for the windings of the strip 30. To this end all the support rollers 12 are provided with a number of circular grooves 40 spaced in accordance with the mandrel pitch. The grooves in each roller are axially displaced with respect to the corresponding grooves in an adjacent support roller so that the accumulated displacement over the entire circumference is equal to the winding pitch.

Figure 7:
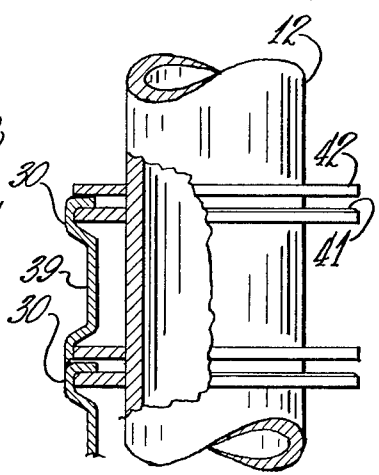

The grooves 40, as shown in FIG. 6 are adapted to receive the stiffening means on the endless strip 30. The lowermost edge of the groove then provides a support ledge 41 on which the stiffening means rides. As an alternative to the grooves 40, shown in FIGS. 5 and 7, the axial support ledge 41 may be provided by a series of spaced flanges 42 as shown in FIGS. 5 and 7. Still other methods of providing for the axial support of the convolutions of the strip 30 will occur to those skilled in the art.

Referring again to FIG. 5, it is obvious that it is not essential to the construction of a mandrel according to the invention that the strip be wound with the individual convolutions in close edge to edge relationship. This is true since all axial loading on the mandrel is transmitted to the support rollers, via the support means, by the stiffening means on the strip. Actually it would be difficult to obtain a completely closed mandrel surface by the arrangement shown in FIGS. 1 and 2 because there will always be a gap between the convolutions equal to the manufacturing tolerances of the strip. However this can be remedied according to the invention by giving the edge of the strip a taper 48 as shown in FIG. 5, which taper fills out approximately the radius 49 formed by the bend on the opposite edge of the strip. By this measure a smooth and tight mandrel surface is obtained. In addition the convolutions of the mandrel surface are capable of taking up a considerable local radial force without impression because the pressure is now transferred to the adjacent strip convolutions.

In the embodiment of the invention illustrated by FIG. 7, the strip 30 has been given a corrugation 39 along its entire length in addition to the profiled edge mentioned above. This additional feature will result in products having a helically corrugated wall giving an improved rigidity against radial deformation at a low material consumption.

In FIG. 7, the diameter of the support rollers 12 has been reduced between the grooves 40 in order to save weight and accomodate the corrugation in the strip.

When determining the possible depth of the corrugation it is necessary to again consider the degree of curvature of the mandrel wall and bending of the strip when passing over guides and support rollers. However, it is noted, for the larger diameters where a deep corrugation is required for maximum rigidity of products there is less bending of the strip, and accordingly a deeper corrugation is rendered possible.

An additional modification to the basic invention is shown in FIG. 3 wherein means for internally heating the mandrel to accelerate the cure of the tubing are provided. Specifically, radiation heaters, or other thermal energy sources 50 are disposed along the entire length of each support unit. Of course it is also within the inventive concept here, that where desired, the mandrel can be used in combination with external heat sources.

FIGS. 8–13 show a horizontally oriented mandrel embodying the invention but having additional features different from the mandrel of FIGS 1–7 and the prior art mandrels. In particular this mandrel incorporates a unique combination roller drive and diameter adjustment mechanism.

Figure 9:
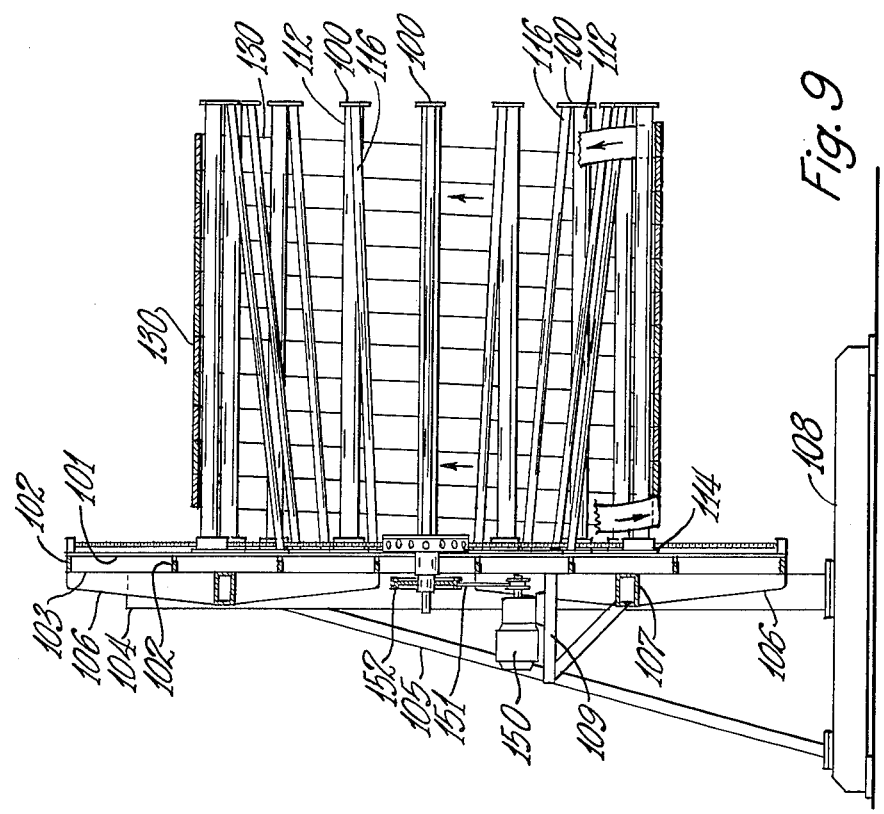

Referring to FIG. 9, the core of the mandrel is comprised of a plurality of support units 100 disposed about the periphery of an imaginary horizontal cylinder. Each support unit consists of a support roller 112, an angular brace 116 and a base plate 114. Support rollers of the type shown in FIGS. 5 and 7 are preferred for this embodiment because of their lighter weight. The support units are assembled in cylindrical arrangement and are bolted to the large circular head plate 101.

The headplate 101 is fixably mounted on a support frame consisting of a pair of uprights 104, cross braces 107, angular braces 105, and base members 108. The base members 108 extend beyond the headplate 101 to support the cantilevered mandrel.

Figure 8:
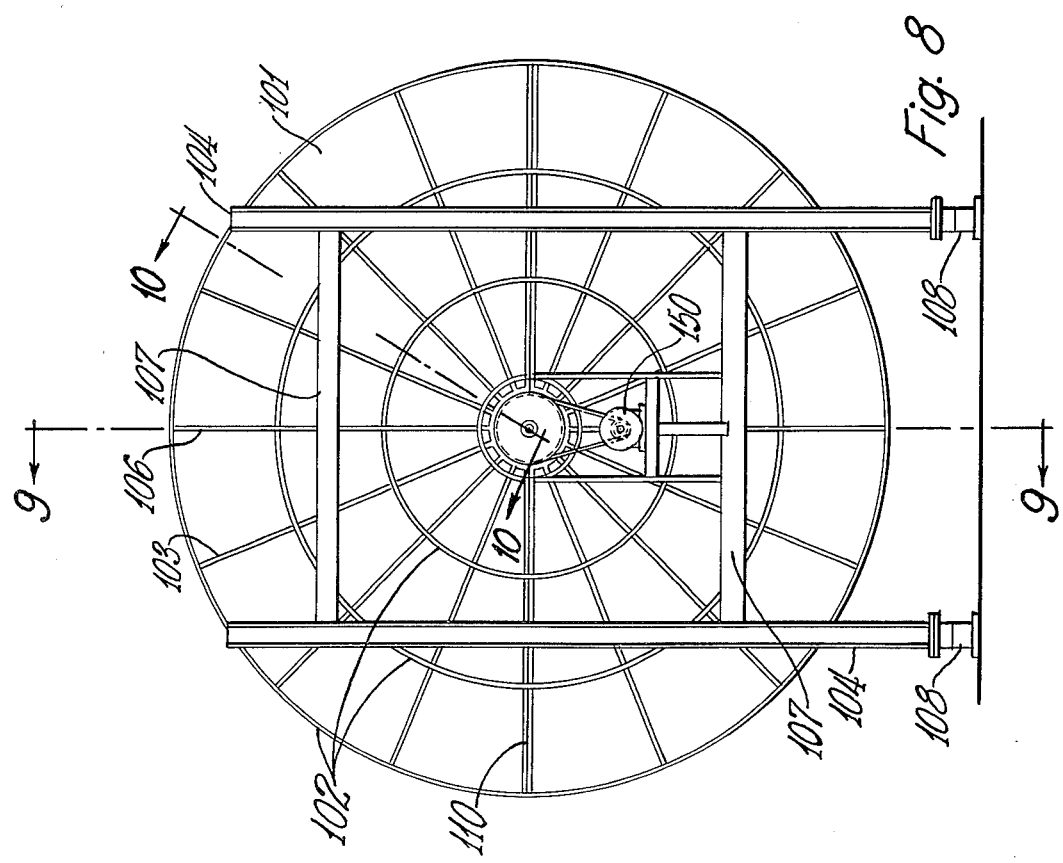

The headplate 101 is made rigid by a series of welded-in-place concentric rings 102 and radial ribs 103. Since the invention is particularly suitable for large diameter mandrels in the range of 20 to 40 feet, it is anticipated that the headplate 101 would be made in sections for handling and transportation. At the manufacturing site the sections would be assembled by any suitable means such as welding or bolting. By way of example the headplate of FIG. 8 is shown as made in two sections joined along the seam indicated at 110. Since each section of the headplate is still quite large, additional braces, such as shown at 106, may be used to reinforce a section.

A drive 150 is mounted on support 109 attached to the mandrel support frame. As discussed later, the drive 150 is adaptable to synchronously drive all of the support rollers 112.

Like the mandrel of FIG. 1, the forming surface of the mandrel of FIG. 9 is an endless strip 130 helically wound in abutting convolutions about the support units 100. At the free end of the mandrel the strip is coiled inward and back through the interior of the mandrel to a first convolution adjacent the headplate 101.

As the drive 150 simultaneously rotates the rollers 112, the endless strip 130 is continuously circulated along its helical surface forming path and back through the center of the machine. Thus the mandrel described can be used with auxiliary material applicators to form large diameter tubing of any desired length.

Referring now to FIGS. 10-13, the combined drive and radial adjustment mechanism of the mandrel of FIGS. 8 and 9 is described. As discussed earlier, the base plate 114 of each support unit 100 is bolted to the mandrel headplate 101. In FIGS. 10 and 12, baseplate 114 is fastened to headplate 101 by bolts 122, which extend through radially extending slots in headplate 101. Washers 123 are machined to fit in the slot in the headplate for better fastening.

A housing 140 is located in a central opening in the headplate 101. The housing 140 is fixably attached to the headplate through the welded flange 141. Housing 140 supports two bearings 143 which in turn support the main drive shaft 150.

Mounted on the drive shaft 150 on the back side of the headplate 101 is drive sprocket 152 held in place by collar 154 and journaled in bearing 153. Sprocket 151 is connected to and driven by the drive motor 150 through roller chains 151. It will be apparent that other types of power transmission components, such as V-belts and pulleys or gears could be used in place of the chain and sprocket drive shown.

Mounted at the opposite end of drive shaft 150 is a large beveled ring gear 156 which engages a number of radially aligned beveled pinion gears 161. Each of the gears 161 is mounted on and keyed to the end of a radially extending shaft 160. The gear 161 and the inner end of shaft 160 are supported in bearing 158. The bearing 158 is mounted in annular housing 159 which supports all the corresponding bearings for other support units. Housing 159 is attached to flange 141 and covers the ring gear 156.

For each of the support units 100 there is a shaft 160 mounted between the inner bearing 158 and an outer bearing 162 which is fixed to the headplate 101. As shown, the shaft 160 extends through the brace 116 and the non-rotating, hollow inner shaft 118 of roller 112. The shaft 160 is keyed and threaded for a substantial distance along its outer end for reasons to be discussed later.

The shaft 160 also extends through bevel gear 164 and collar 165 both of which are rotatably supported by bearing 167. The bearing 167 is mounted in housing 166 which is permanently fixed to the baseplate 114 by any suitable means.

The bevel gear 164 engages bevel gear 168 which is attached to support roller 112. Bearing 169 supports the roller 112 on shaft 118. Although it is not shown, roller 112 is similarly supported by a bearing attached to fixed shaft 118 and brace 116 at the free end of the mandrel.

The bevel gear 164 is threaded internally to match the threaded portion of shaft 160. Gear 164 is bolted to collar 165. A pivotable key 171 is attached to the collar 165 by pin 172 and is adapted to engage either the slot 170 in shaft 160 or a slot in the housing 166.

Having thus identified its various parts the operation of the unique mechanism is as follows. When the key 171 is in engagement with the slot 170 of the shaft 160 as shown in FIG. 13, the mechanism is in the drive position. Drive 150 rotates shaft 153 and ring gear 156. Gear 156 in turn rotates the shafts 160 through gear 161. Since the collar 165 is now keyed to the shaft 160 and is bolted to gear 164, gear 164 will rotate with the shaft. Gear 164 in turn drives gear 168 to rotate the support roller 112.

Since the corresponding components for each support unit are all driven through the common ring gear 156, the described mechanism drives all the support rollers 112 synchronously.

When it becomes necessary to change the diameter of the mandrel, the same mechanism is used to simultaneously move the support units 100 in or out radially. To accomplish this adjustment, with the drive stopped, the key 171 is pivoted out of engagement with the slot 170 in shaft 160, and into engagement with a slot in the housing 166, as shown in FIG. 10. The bolts 122 for each support unit are loosened to allow that unit to move relative to headplate 101.

When the drive 150 is started the ring gear 156 will again rotate each of the shafts 160 synchronously. Since the collar 165 is now keyed to the housing 166 fixed to the baseplate 114, the gear 164 cannot rotate with the shaft 160. However, since the gear 164 is still threadably engaged with the shaft 160 it will move axially of the shaft 160 as the latter turns. Thus as the shaft 160 rotates the entire support unit 100 will move radially in or out along the headplate 101. Since all the support units are similarly driven they will be moved the same distance simultaneously.

Once the desired radial adjustment has been made, the support unit is secured by tightening the bolts 122. The pivoted key 171 on each unit is moved back into engagement with the corresponding shaft 160 and the drive system is ready for operation.

The only other operation necessary in changing mandrel diameter is to make an appropriate adjustment in the length of the endless strip 130. Thus the drive and adjustment system described greatly simplifies the changing of diameter of endless mandrels of the type described by eliminating the need to individually adjust each radial support unit.

In the preceding discussion of the invention the core of the mandrel is described as being stationary. By this it is meant that the core does not rotate along with the mandrel surface. Unlike the prior art mandrels the endless band moves relative to the core in both the circumferential and axial directions. Thus it is understood that where the core is also fixed to the environment, the tubing being formed must necessarily rotate with respect to the environment.

In the alternative, it is conceivable that there are applications where it would be undesirable for the product to rotate. This can be remedied within the scope of the invention by providing for rotation of the mandrel core at the same speed but in the opposite circumferential direction as the moving strip. The result is a mandrel surface having only longitudinal movement with respect to the environment. Such a mandrel would be suited for use with such material feed means as a planetary winder or a concentric extruder to produce continuous piping which can be simultaneously laid in a trench, etc.

Having thus described the invention, other variations, adaptations, modifications, and arrangements may occur to those skilled in the art to which the invention relates.

I claim:

1. A mandrel for the production of tubing, comprising:
   a hollow core including a plurality of parallel elongated members spaced equidistantly from each other about the circumference of a circle and slideably mounted on a common headplate;
   an endless strip wound helically around said core in a direction away from the headplate and extending back through the interior of the core, successive convolutions of the helically wound strip forming a continuous surface on which the tubing is formed;
   means for advancing said endless strip along a helical path away from the headplate; and
   adjustment means for simultaneously moving said elongated members radially of the circle equal distances when a change in diameter of said core is desired.

2. A mandrel as recited in claim 1, wherein said adjustment means comprises a rotatable drive mounted centrally of said headplate, a plurality of rotatable shafts extending radially of the circle each having means connected at one end and engaging said rotatable drive, at least a portion of each shaft being threaded, and means associated with each of said elongated members in threaded engagement with a corresponding one of said shafts whereby the member is moved radially of the circle along the shaft when the shaft rotates.

3. A mandrel for the production of tubing, comprising:
   a hollow core including a plurality of parallel spaced rollers disposed equidistantly from each other about the circumference of a circle and supported by a headplate;
   an endless strip wound helically around said core in a direction away from the headplate and extending back through the interior of the core, successive convolutions of the helically wound strip forming a continuous cylindrical surface on which the tubing is formed;
   drive means for rotating at least one of said rollers to advance said endless strip about said core; and
   adjustment means mounted on said headplate and connected to each of said rollers, the adjustment means being effective to simultaneously move said rollers radially of the circle equal distances when a change in the diameter of said core is desired.

4. A mandrel for the production of tubing, comprising:
   a hollow core including a plurality of parallel spaced rollers disposed equidistantly from each other about the circumference of a circle, each roller being rotatably mounted on a common headplate and movable along said headplate radially of the circle;
   an endless strip wound helically around said core in a direction away from the headplate and extending back through the interior of the core, successive convolutions of the helically wound strip forming a continuous cylindrical surface on which the tubing is formed; and
   a combination drive and diameter adjustment means mounted on said headplate and being selectively effective to produce either synchronous rotation of said rollers to advance said endless strip about said core or simultaneous movement of said rollers radially of the circle to change the diameter of the core.

5. A mandrel as recited in claim 4, wherein said combination drive and diameter adjustment means comprises a central rotatable drive, and a plurality of radially extending mechanical transmission members each connected at one end to said central drive and at some point along its length to one of said rollers in a manner to selectively effect either rotation of the roller or movement of the roller radially of the circle when said central drive is rotated.

6. A mandrel as recited in claim 5 wherein said combination drive and diameter adjustment means comprises a main gear mounted centrally of said headplate, a plurality of shafts, one for each of said rollers, mounted on said headplate and extending radially of the circle, at least a portion of each shaft being threaded, each shaft having a first gear connected to one end thereof and rotatably engaging said main gear, each shaft having a second gear spaced radially outwardly of the circle from the first gear and rotatably engaging a gear on a respective one of said rollers, the second gear being threaded to mate with the threaded part of the shaft, and means for selectively locking the second gear of each shaft relatively either to the shaft in a manner such that it will rotate with the shaft and thereby rotate the respective roller, or to the respective roller in a manner such that it does not rotate with the shaft but moves longitudinally of the shaft when the shaft is rotated, whereby said rollers are simultaneously moved along said headplate radially of the circle to effect a change in the diameter of the core.

7. A mandrel as recited in claim 6 wherein said locking means for the second gear of each shaft is a key pivotably mounted on the second gear and adpated to engage either a slot in the shaft when rotation of the respective roller is desired or a slot in a bearing housing for the second gear when adjustment of the roller radially of the headplate is desired, the bearing housing and the roller being mounted on a baseplate movable radially of the headplate.

* * * * *